Sept. 22, 1942.  G. W. LEYDE  2,296,287
ELECTRIC WATER LIGHT
Filed Jan. 16, 1941
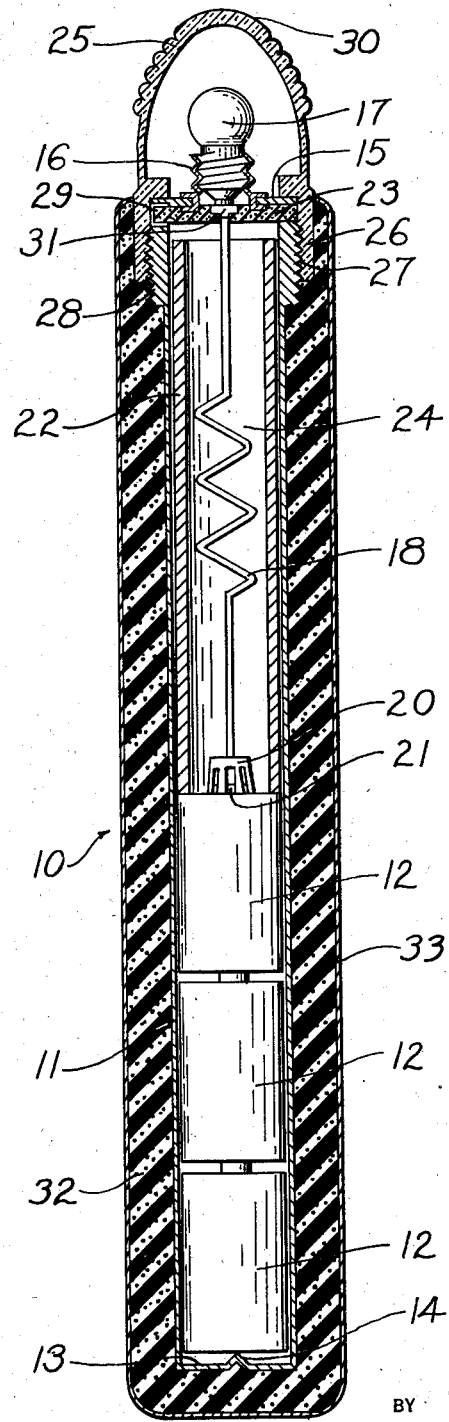
INVENTOR
Glen W. Leyde
BY
ATTORNEY Patented Sept. 22, 1942

2,296,287

UNITED STATES PATENT OFFICE 2,296,287

ELECTRIC WATER LIGHT

Glen W. Leyde, Arlington, Va.

Application January 16, 1941, Serial No. 374,683

15 Claims. (Cl. 9—8.3)

(Granted under the act of March 3, 1883, as amended April 30, 1928; 370 O. G. 757)

This invention relates to an electric water light and has for an object to provide a floating light for use independently or with buoys, rafts, boats and floats.

A further object of this invention is to provide an electric water light also intended to act as a seaplane landing lamp which may be dropped overboard from a boat or from the seaplane and will automatically light up and float in the water to serve as a beacon in guiding the seaplane in locating the water line when landing at night.

A further object of this invention is to provide an electrical water light which may be dropped safely into the water from a condiderable height, as from the top deck of a vessel or from a traveling airplane at night, which will land safely without injury in the water, and which once it strikes the water will immediately return to the surface thereof and automatically light up.

A further object of this invention is to provide an electric water light which may be dropped safely into the water from a considerable height without injury or shock to the mechanism thereof.

A further object of this invention is to provide a light that will normally be in an inverted and open circuit condition but will automatically light as soon as the light is rotated to its operating position.

With the foregoing and other objects in view, the invention consists in the construction, combination and arrangement of parts hereinafter described and illustrated in the drawings, in which:

The figure is a partly sectional longitudinal view of the electric water light of this invention.

There is shown at 10 the electric water light of this invention, consisting of a metal tube 11 of sufficient rigidity and having an internal diameter suitable to receive a plurality of conventional flash light batteries 12 therein, one above the other. The bottom 13 of the tube 11 is provided with a boss 14 which will serve as a contact with the lowermost battery 12 when the same is in position thereon. The tube 11 is of a length and diameter considerably greater than the diameter or added length of the plurality of batteries 12 to be placed therein.

Removably secured across the top of the tube 11 in any conventional manner is a closure comprising a socket base 15 through which extends the socket 16 for receiving a flash light lamp 17. Extending from the metal plug 31 is a wire conduit 18 whose other end is attached to a spring cap 20 of a size and diameter that it will fit onto the contact pole 21 of the uppermost battery 12, this wire 18 being of sufficient length that it extends from the metal contact 31 to the position of the uppermost battery 12 when the plurality of batteries are in contact with each other and with the tube contact 14. The space above the uppermost battery 12 and the bottom of the socket base 15 may be occupied by a hollow, spacing, shock-reducing cylinder 22, preferably made of cardboard, plastic material, or other material having similar characteristics.

To facilitate assembly and to assist in waterproofing the interior of the light, a rubberized fabric washer 23 is provided between the socket base 15 and the top edge of the tube 11, a flat metal ribbon 29 extending for a distance about its perimeter so as to carry the circuit from the tube 11 to the socket base 15. Secured through the center of the washer is the metal plug 31 to the bottom of which is soldered the wire 18, while the top of the plug, when in assembled position, completes the circuit to the base of the lamp 17. The wire 18 is then extended through the hollow 24 of the hollow cylinder 22 for attachment to the pole 21. In replacing the socket base 15 in position on the tube 11, the upper external diameter of the hollow cylinder 22 will be such that there will be a loose fit between the tube 11 and the hollow cylinder 22.

Placed about the lamp 17 is a fresnel lens 25 which concentrates the light beams in a horizontal plane, being secured in position by a depending skirt 26 having an internal thread 27 adapted to cooperate with an external thread 28 provided on the upper outer end of tube 11. This fresnel lens 25 will be preferably made of a non-breakable, transparent plastic material, although it may be made of suitable reinforced glass.

Although the tube 11 is of such a length above the batteries 12 that the assembly will be floatable in the water with the lamp and lens projecting above the water line, this floatability of the light is increased by the presence of an overcoat 32 made of a cushioning floatable material such as expanded cellular rubber, having a reinforcing canvas sheathing 33 extending completely thereabout. This overcoat 32 is provided with a bore of a diameter substantially equal to the external diameter of the tube 11 and of a length equal to the length of the tube 11.

Inasmuch as expanded cellular rubber is waterproof, such construction tends to prevent any possibility of water leaking into the tube to short circuit the batteries and interfere with the operation of the light.

In operation, the electric water light, having been assembled as above described, is carried in a rack and stored in an upside down position; that is, with the lens end 30 downwardly. The weight of the batteries 12 in this position will bring the lowermost battery 12 out of contact with the tube contact 14. When thrown overboard or dropped from an airplane, either separately or attached to a life buoy, raft, or other floating object by a line, the electric water light will right itself once it has struck the water, and float to the top, with the weight of the batteries causing the batteries to move downwardly and completing the electrical circuit through the tube contact 14, the tube 11, the rim contact 29, the socket base 15, the socket 16, lamp 17, the center contact 31, the contact wire 18, the cap 20, and the battery pole 21. Thus, as long as the light is in an upside down position, the circuit is incomplete, but once placed in an upright position or floated into an upright position, the lamp is automatically lighted.

The expanded cellular rubber overcoat 32 not only assists in providing floatability and waterproofing characteristics to the electric water light but also provides shock resistance as the light strikes the water surface, preventing damage or injury thereto.

Obviously, if desired to project a beam upwardly as well as horizontally, a reflector surface may be placed on the top of the socket base 15 to increase the amount of vertical light. The water light of this invention is thus watertight, positively buoyant, non-absorbent of water, lights automatically upon becoming immersed in water, immediately assumes an upright position, and furnishes a brilliant light for long periods of time for illumination or marking positions. When possible, after use, it may be salvaged for reuse, the batteries being easily replaceable by temporarily removing the lens, socket base and hollow cylinder.

Other modifications and changes in the number and arrangement of the parts may be made by those skilled in the art without departing from the nature of this invention, within the scope of what is hereinafter claimed.

The invention described herein may be manufactured and/or used by or for the Government of the United States of America for governmental purposes without the payment of any royalties thereon or therefor.

Having thus set forth and disclosed the nature of this invention, what is claimed is:

1. A buoyant electric water light comprising a tube closed at one end, a plurality of battery units in said tube adapted to contact with the closed end of the tube in completing a circuit therethrough only when the light is in substantially upright position, a closure for the other end of said tube, a lamp socket base above said closure, means for spacing the uppermost battery unit from said closure, an extendable conduit connecting the lamp socket base through said closure to the uppermost battery unit, a lamp in said socket base, a lens, and means for securing said lens to said lamp end of said tube comprising a depending skirt attachable to the upper end of said tube.

2. A buoyant electric water light comprising a tube closed at one end, a plurality of battery units in said tube adapted to contact with the closed end of the tube in completing a circuit therethrough, a closure for the other end of said tube, a lamp socket base thereabove, means for spacing the uppermost battery unit from said closure, an extendable conduit connecting the lamp socket base through said closure to the uppermost battery unit, a lamp in said socket base, a lens, means for securing said lens to said lamp end of said tube comprising a depending skirt attachable to the upper end of said tube, and a resilient overcoat extending about said tube and overlapping said lens skirt, said lens skirt and said lens being an integral unit.

3. A buoyant electric water light comprising a tube closed at one end, a plurality of battery units in said tube adapted to contact with the closed end of the tube in completing a circuit therethrough, a closure for the other end of said tube, a lamp socket base thereabove, means for spacing the uppermost battery unit from said closure, an extendable conduit connecting the lamp socket base through said closure to the uppermost battery unit, a lamp in said socket base, a lens, means for securing said lens to said lamp end of said tube comprising a depending skirt attachable to the upper end of said tube, a resilient overcoat extending about said tube and overlapping said lens skirt, said lens skirt and said lens being an integral unit, said resilient buoyant overcoat being of expanded cellular rubber having its upper edge snugly overlapping said depending lens skirt to waterproof said light.

4. A buoyant electric water light comprising a tube closed at one end, a plurality of battery units in said tube adapted to contact with the closed end of the tube in completing a circuit therethrough, a closure for the other end of said tube, a lamp socket base thereabove, means for spacing the uppermost battery unit from said lamp socket base, an extendable conduit connecting the lamp socket base through said closure to the uppermost battery unit, a lamp in said socket base, a lens, means for securing said lens to said lamp end of said tube comprising a depending skirt attachable to the upper end of said tube, a resilient overcoat extending about said tube and overlapping said lens skirt, said lens skirt and said lens being an integral unit, said resilient buoyant overcoat being of expanded cellular rubber having its upper edge snugly overlapping said depending lens skirt to waterproof said light, and a reinforcing canvas sheathing about said expanded cellular rubber overcoat.

5. A buoyant electric water light comprising a tube closed at one end, a plurality of battery units in said tube adapted to contact with the closed end of the tube in completing a circuit therethrough, a closure for the other end of said tube, a lamp socket base thereabove, means for spacing the uppermost battery unit from said lamp socket base, an extendable conduit connecting the lamp socket base through said closure to the uppermost battery unit, a lamp in said socket base, a lens, and means for securing said lens to said lamp end of said tube comprising a depending skirt attachable to the upper end of said tube, said spacing means comprising a shock-reducing plug.

6. A buoyant electric water light comprising a tube closed at one end, a plurality of battery units in said tube adapted to contact with the closed end of the tube in completing a circuit therethrough, a closure for the other end of said tube, a lamp socket base thereabove, means for spacing the uppermost battery unit from said lamp socket base, an extendable conduit connecting the lamp socket base through said closure to the uppermost battery unit, a lamp in said socket base, a lens, and means for securing said lens to said lamp end of said tube comprising a depending skirt attachable to the upper end of said tube, said spacing means comprising a shock reducing cylindrical hollow plug through which said conduit extends.

7. A buoyant electric water light comprising a tube closed at one end, a plurality of battery units in said tube adapted to contact with the closed end of the tube in completing a circuit therethrough, a closure for the other end of said tube, a lamp socket base thereabove, means for spacing the uppermost battery unit from said lamp socket base, an extendable conduit connecting the lamp socket base to the uppermost battery unit, a lamp in said socket base, a lens, means for securing said lens to said lamp end of said tube comprising a depending skirt attachable to the upper end of said tube, said spacing means comprising a shock-reducing cylindrical hollow plug, said cylindrical hollow plug fitting loosely in the upper end of the tube to minimize the movement of the battery units and thus reduce the shock if the end strikes the water as the light is dropped, and to maintain the center of gravity below the center of buoyancy.

8. A buoyant electric water light comprising a tube closed at one end, a plurality of battery units in said tube adapted to contact with the closed end of the tube in completing a circuit therethrough, a closure for the other end of said tube, said closure comprising a rubberized fabric washer, a rim contact thereon, and a center contact therethrough, a lamp socket base thereabove, means for spacing the uppermost battery unit from said lamp socket base, an extendable conduit connecting the lamp socket base to the uppermost battery unit, a lamp in said socket base, a lens, means for securing said lens to said lamp end of said tube comprising a depending skirt attachable to the upper end of said tube, said spacing means comprising a cylindrical plug, means for detachably securing one end of said extendable conduit to the uppermost battery unit, the other end of the extendable conduit being secured to said closure center contact to complete the circuit to said lamp.

9. An electric light comprising a tube closed at one end, a closure for the other end of said tube, a lamp socket base above said closure, circuit means extending from said tube to said lamp socket base and from said lamp socket base through said closure, said circuit means including an extendable means depending from said closure means, battery means in said tube, means for attaching the extendable end of said extendable means to said battery means, means at the bottom of said tube for completing the circuit through said battery means, and spacing means for supporting said battery means out of contact with said circuit completing means at the bottom of said tube when said light is in inverted position and allowing said battery means to move to circuit completing position when said light is in upright position.

10. An electric light comprising a tube closed at one end, a closure for the other end of said tube, a lamp socket base above said closure, circuit means extending from said tube to said lamp socket base and from said lamp socket base through said closure, said circuit means including an extendable conduit depending from said circuit means in said closure means, battery means in said tube, means for attaching the extendable end of said extendable conduit means to said battery means, and a gravity switch for said light comprising means at the bottom of said tube for completing the circuit through said battery means, and spacing means for supporting said battery means out of contact with said circuit completing means at the bottom of said tube when said light is in inverted position and allowing said battery means to move to circuit completing position when said light is in upright position.

11. A self-lighting buoyant electric water light comprising a tube closed at one end, a closure for the other end of said tube, a lamp socket base above said closure, circuit means extending from said tube to said lamp socket base and from said lamp socket base through said closure, said circuit means including an extendable circuit conduit depending from said circuit means in said closure means, battery means in said tube, means for attaching the extendable end of said extendable conduit means to said battery means, a gravity switch for said light comprising means at the bottom of said tube for completing the circuit through said battery means, spacing means for supporting said battery means out of contact with said circuit completing means at the bottom of said tube when said light is in inverted position and allowing said battery means to move to circuit completing position when said light is in upright position, and buoyancy means enclosing said tube with the center of buoyancy thereof disposed above the center of gravity of said light to cause said light to float in upright position.

12. A buoyant electric water light comprising a tube closed at one end and having an electric lamp mounted on the other end, battery means mounted within said tube for free sliding movement therein when said light is rotated between upside down and right side up positions, an extensible and contractible electrical connection between said battery means and said lamp, and a contact adapted to be engaged by said battery means when said water light is in an upright position to complete a circuit through said lamp.

13. A buoyant electric water light comprising a tube closed at one end and having an electric lamp mounted on the other end, battery means mounted within said tube for free sliding movement therein when said light is rotated between upside down and right side up positions, an extensible and contractible electrical connection between said battery means and said lamp, a contact adapted to be engaged by said battery means when said water light is in an upright position to complete a circuit through said lamp, and means for restricting the movement of said battery means within said tube.

14. A buoyant electric water light comprising a tube closed at one end and having an electric lamp mounted on the other end, battery means mounted within said tube for free sliding movement therein when said light is rotated between upside down and right side up positions, an extensible and contractible electrical connection between said battery means and said lamp, a contact adapted to be engaged by said battery means when said water light is in an upright position to complete a circuit through said lamp, and a buoyant casing for said tube with the center of buoyancy thereof disposed above the center of gravity of said light to cause said light to float in an upright position.

15. A buoyant shock absorbing electric water light comprising a tube closed at one end, a battery means in said tube adapted to contact with the closed end of the tube in completing the circuit therethrough only when the light is in substantially upright position, a closure for the other end of said tube, said closure including a lamp socket, shock absorbing means spacing said battery means from said closure, and conduit means connecting the lamp socket to the battery means.

GLEN W. LEYDE.